(12) United States Patent
Li et al.

(10) Patent No.: US 12,069,361 B2
(45) Date of Patent: Aug. 20, 2024

(54) CAMERA MODULE HAVING CIRCUIT BOARD WITH IMRPOVED FLATNESS AND ELECTRONIC DEVICE

(71) Applicant: Rayprus Technology (Foshan) Co., Ltd., Foshan (CN)

(72) Inventors: Kun Li, Jincheng (CN); Shin-Wen Chen, New Taipei (TW); Bo-Ying Zhu, New Taipei (TW); Yu-Shuai Li, Shenzhen (CN); Jian-Chao Song, Jincheng (CN); Wu-Tong Wang, Jincheng (CN)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 116 days.

(21) Appl. No.: 18/094,587

(22) Filed: Jan. 9, 2023

(65) Prior Publication Data
US 2024/0089573 A1 Mar. 14, 2024

(30) Foreign Application Priority Data
Sep. 9, 2022 (CN) .......................... 202211104329.3

(51) Int. Cl.
*H04N 23/57* (2023.01)
*H04N 23/51* (2023.01)
*H04N 23/55* (2023.01)

(52) U.S. Cl.
CPC ............ *H04N 23/55* (2023.01); *H04N 23/51* (2023.01); *H04N 23/57* (2023.01)

(58) Field of Classification Search
None
See application file for complete search history.

(56) References Cited

U.S. PATENT DOCUMENTS

| | | | |
|---|---|---|---|
| 8,780,243 B2* | 7/2014 | Chen | H04N 25/00 257/432 |
| 10,044,917 B2* | 8/2018 | Otani | H04N 23/57 |
| 2005/0012032 A1* | 1/2005 | Onodera | H01L 23/3107 257/E21.503 |
| 2008/0079829 A1* | 4/2008 | Choi | H01L 27/14618 348/294 |
| 2009/0033790 A1* | 2/2009 | Lin | G02B 7/023 348/374 |

(Continued)

FOREIGN PATENT DOCUMENTS

| | | |
|---|---|---|
| CN | 208569282 U | 3/2019 |
| CN | 114390782 A | 4/2022 |

*Primary Examiner* — Mekonnen D Dagnew
(74) *Attorney, Agent, or Firm* — ScienBiziP, P.C.

(57) ABSTRACT

A photosensitive assembly includes a circuit board. The circuit board has a first surface, a second surface opposite to the first surface, and a first through hole extending through the first surface and the second surface. A photosensitive chip is disposed on the second surface. The photosensitive chip has a photosensitive area and a non-photosensitive area connected to the photosensitive area, the non-photosensitive area is electrically connected to one side of the second surface, and the photosensitive area is exposed from the first through hole. A reinforcing plate is disposed on the first surface. A thermal conductive layer is disposed on the photosensitive chip, and the thermal conductive layer includes a silica gel or a metal.

20 Claims, 6 Drawing Sheets

(56) References Cited

U.S. PATENT DOCUMENTS

| | | | |
|---|---|---|---|
| 2009/0128681 A1* | 5/2009 | Kim | H04N 23/57 |
| | | | 348/335 |
| 2009/0322929 A1* | 12/2009 | Webster | H01L 27/14618 |
| | | | 348/340 |
| 2011/0194023 A1* | 8/2011 | Tam | H04N 23/54 |
| | | | 348/374 |
| 2013/0235263 A1* | 9/2013 | Ryu | H04N 23/57 |
| | | | 348/374 |
| 2014/0055669 A1* | 2/2014 | Chen | H04N 23/54 |
| | | | 348/374 |
| 2014/0139710 A1* | 5/2014 | Chen | H04N 23/57 |
| | | | 250/206 |
| 2017/0280558 A1* | 9/2017 | Ohara | G03B 17/55 |

* cited by examiner

CAMERA MODULE HAVING CIRCUIT BOARD WITH IMRPOVED FLATNESS AND ELECTRONIC DEVICE

FIELD

The subject matter relates to imaging devices, and more particularly, to a photosensitive assembly, a camera module having the photosensitive assembly, and an electronic device having the camera module.

BACKGROUND

Electronic devices, such as notebook computers, has become thinner and thinner. The electronic device may include a camera module. To manufacturing a thin camera module, a flip chip process is usually used to electrically connect a photosensitive chip to a rigid-flexible circuit board. However, due to different thermal expansion coefficients between the layers of the circuit board, surfaces of the circuit board may become uneven after being heated. Thus, empty soldering may occur during the flip chip process, which leads to failure of the photosensitive chip.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
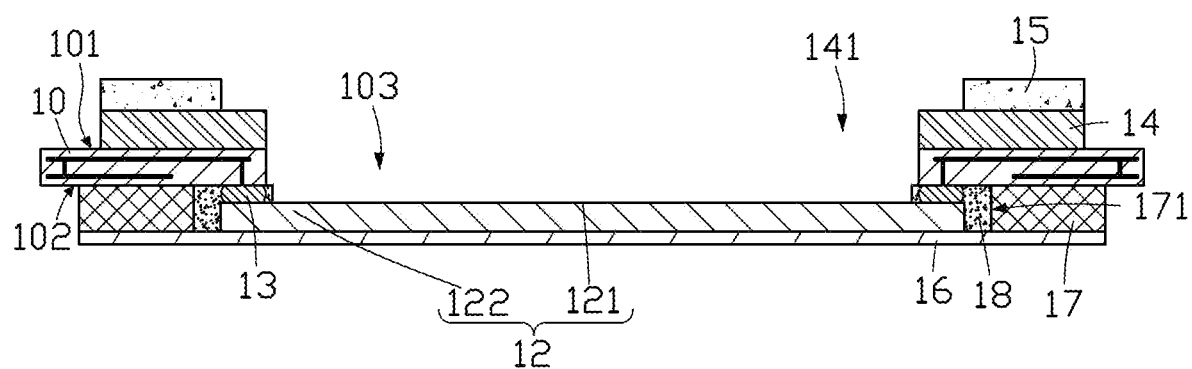
FIG. 1 is a cross-sectional view of a photosensitive assembly according to an embodiment of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, a photosensitive assembly 100 is provided according to an embodiment of the disclosure, which includes a circuit board 10, a photosensitive chip 12, a reinforcing plate 14, a dustproof adhesive 15, a thermal conductive layer 16, a hollow support frame 17, and an insulating colloid 18.

The circuit board 10 includes a first surface 101 and a second surface 102 opposite to the first surface 101. The circuit board 10 is provided with a first through hole 103 through the first surface 101 and the second surface 102. The reinforcing plate 14 is disposed on the first surface 101. The photosensitive chip 12 and the support frame 17 are disposed on the second surface 102. The photosensitive chip 12 is received in the support frame 17. The photosensitive chip 12 covers an end of the through hole 103. The dustproof adhesive 15 is disposed on the reinforcing plate 14. The thermal conductive layer 16 is disposed on the support frame 17 and also covers the photosensitive chip 12. The insulating colloid 18 is between an inner wall of the support frame 17 and a sidewall of the photosensitive chip 12. The insulating colloid 18 fills the gap between the photosensitive chip 12 and the support frame 17.

The photosensitive chip 12 has a photosensitive area 121 corresponding to the first through hole 103 and a non-photosensitive area 122 surrounding the photosensitive area 121. A plurality of first pads (not shown) are provided on the non-photosensitive area 122. A plurality of second pads (not shown) are provided on the second surface 102 of the circuit board 10. The first pads of the photosensitive chip 12 are connected to the second pads of the circuit board 10 through a solder paste 13. The insulating colloid 18 further covers a sidewall of the solder paste 13. The insulating colloid 18 can improve the service life of the photosensitive chip 12.

In at least one embodiment, the circuit board 10 is a flexible circuit board with a thickness of about 0.1 mm. Thus, the circuit board 10 has a smaller thickness than an existing rigid-flexible board with a thickness of 0.2 mm to 0.3 mm. The photosensitive chip 12 is connected to the circuit board 10 through a flip chip process, and the solder paste 13 is a gold ball.

In other embodiments, the photoconductive chip 12 and the circuit board 10 may also be connected by ultrasonic welding, hot pressing welding, or reflow welding.

The reinforcing plate 14 defines a second through hole 141 communicating with the first through hole 103. In at least one embodiment, the reinforcing plate 14 is a stainless steel plate with a thickness of about 0.12 mm. The reinforcing plate 14 can provide reliability reinforcement, and the overall flatness can be improved.

Figure 4:
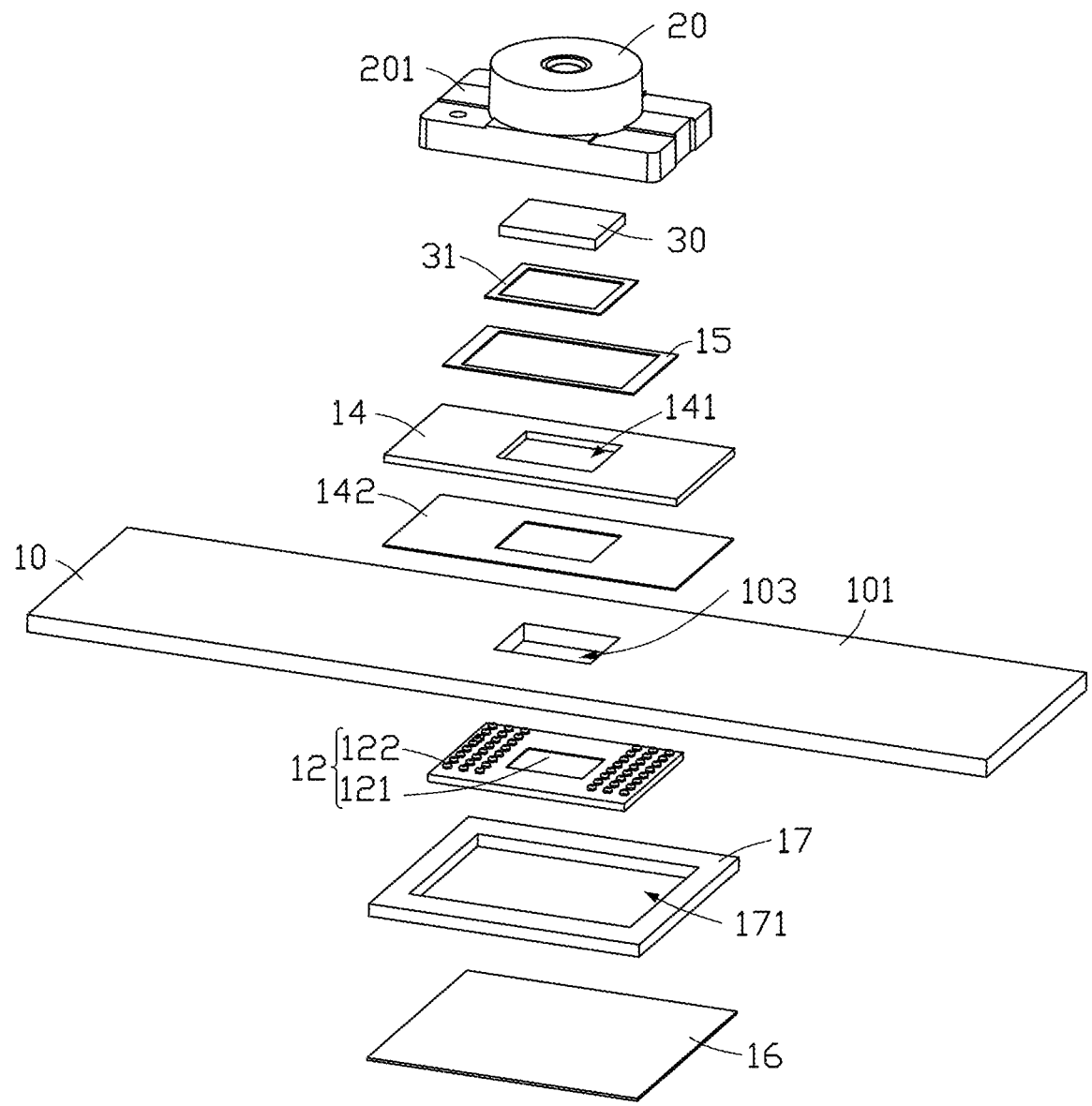
FIG. 4 is an exploded view of the camera module of FIG. 3.

As shown in FIG. 4, the support frame 17 defines a third through hole 171 for receiving the photosensitive chip 12. A surface of the support frame 17 away from the circuit board 10 is substantially flush with a surface of the photosensitive chip 12 away from the circuit board 10.

The thermal conductive layer 16 is made of a material with high heat conductivity. For example, the thermal conductive layer 16 may be made of a heat conductive silica gel or a copper. In at least one embodiment, a thickness of the thermal conductive layer 16 is about 0.05 mm. The supporting frame 17 may be made of a stainless steel. The insulating colloid 18 may be made of an epoxy resin.

With the configuration, since the circuit board 10 is a flexible circuit board, the overall flatness of the circuit board 10 is improved when comparing with the existing rigid-flexible circuit board. The reinforcing plate 14 provides reliability reinforcement for the circuit board 10, which can reduce the overall height of the photosensitive assembly 100. Furthermore, the thermal conductive layer 16 on the photosensitive chip 12 can avoid damages to the photosensitive chip 12 under an external impact and also increase the heat dissipation effect of the photosensitive assembly 100. In addition, the dustproof adhesive 15 can prevent external dust particles from entering the interior of the photosensitive assembly 100, thus ensuring the imaging quality.

Figure 2:
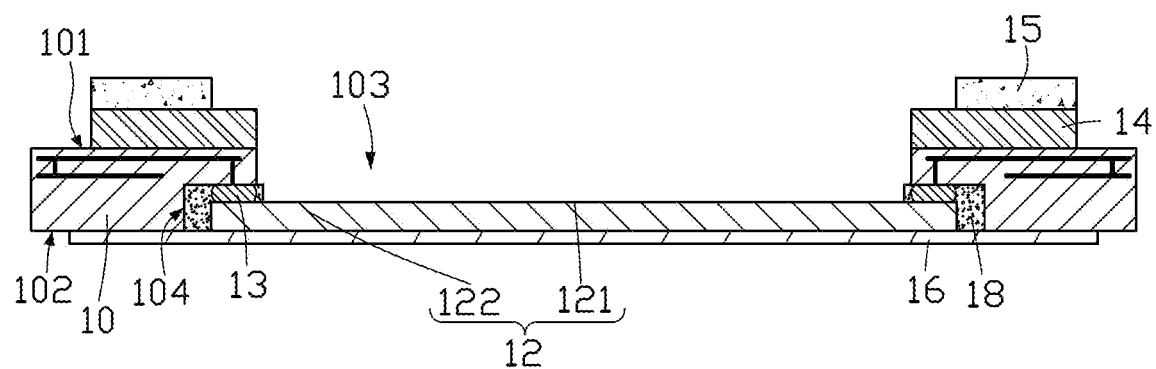
FIG. 2 is a cross-sectional view of a photosensitive assembly according to another embodiment of the present disclosure.

Referring to FIG. 2, a photosensitive assembly 200 is also provided according to an embodiment of the present disclosure. Different from the photosensitive assembly 100, the support frame 17 is omitted in the photosensitive assembly 200. The second surface 102 of the circuit board 10 defines a groove 104 connected to the first through hole 103. The photosensitive chip 12 is received in the groove 104. The circuit board 10 is a rigid circuit board.

With the above configuration, the rigid circuit board 10 can also increase the flatness and heat resistance performance than the existing rigid-flexible circuit board. The groove 104 for receiving the photosensitive chip 12 can further reduce the overall height of the photosensitive assembly 200. The reinforcing plate 14 provides reliability reinforcement for the circuit board 10, which can reduce the overall height of the photosensitive assembly 100. The reinforcing plate 14 also has a high elastic modulus, so that when the flatness of the circuit board 10 is reduced due to thermal stress concentration at high temperatures (such as in the flip chip process or SMT process), the reinforcing plate 14 can generate a reverse torque on the dielectric layer of the circuit board 10, thereby maintaining static balance and further improving flatness and heat resistance performance.

Figure 3:
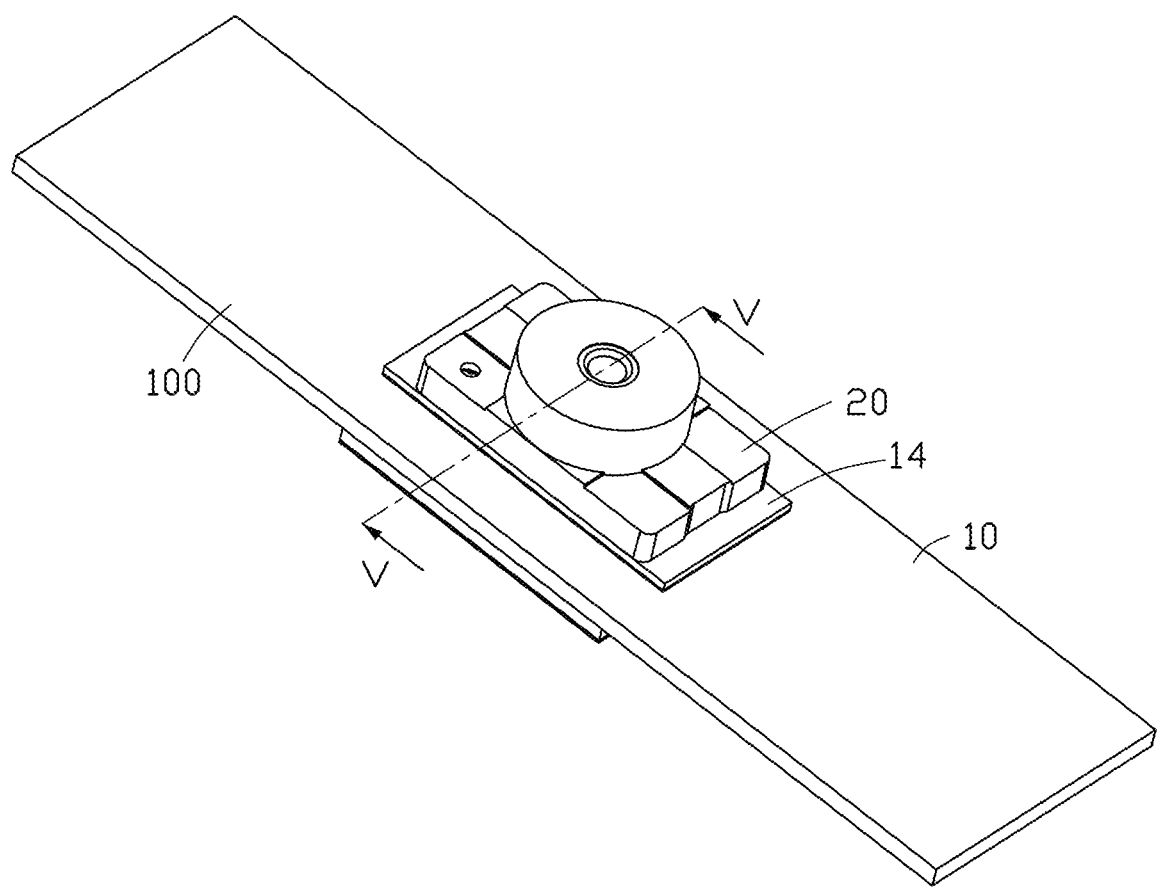
FIG. 3 is an isometric view of a camera module including the photosensitive assembly of FIG. 1.
Figure 5:
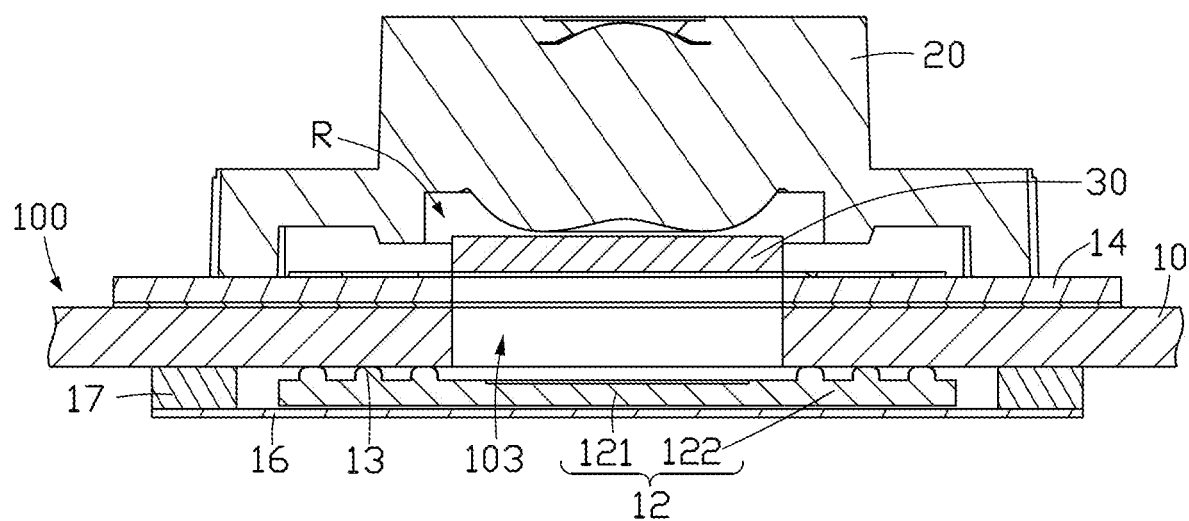
FIG. 5 is a cross-sectional view along a view line V-V of FIG. 1.

Referring to FIGS. 3, 4 and 5, a camera module 300 is also provided according to an embodiment of the present disclosure. The camera module 300 includes the photosensitive assembly 100 (or the photosensitive assembly 200), a lens assembly 20, and a filter 30. The lens assembly 20 includes a lens base 201 disposed on the reinforcing plate 14. The filter 30 is received in the lens base 201 and faces the photosensitive area 121 of the photosensitive chip 12.

A surface of the lens base 201 facing the reinforcing plate 14 defines a receiving chamber R, and the filter 30 is received in the receiving chamber R. A first adhesive layer 31 is arranged between the filter 30 and the reinforcement 14, and the filter 30 is mounted on the reinforcement 14 through the first adhesive layer 31. A second adhesive layer 142 is arranged between the reinforcing plate 14 and the circuit board 10, and the reinforcing plate 14 is mounted on the first surface 101 of the circuit board 10 through the second adhesive layer 142.

Figure 6:
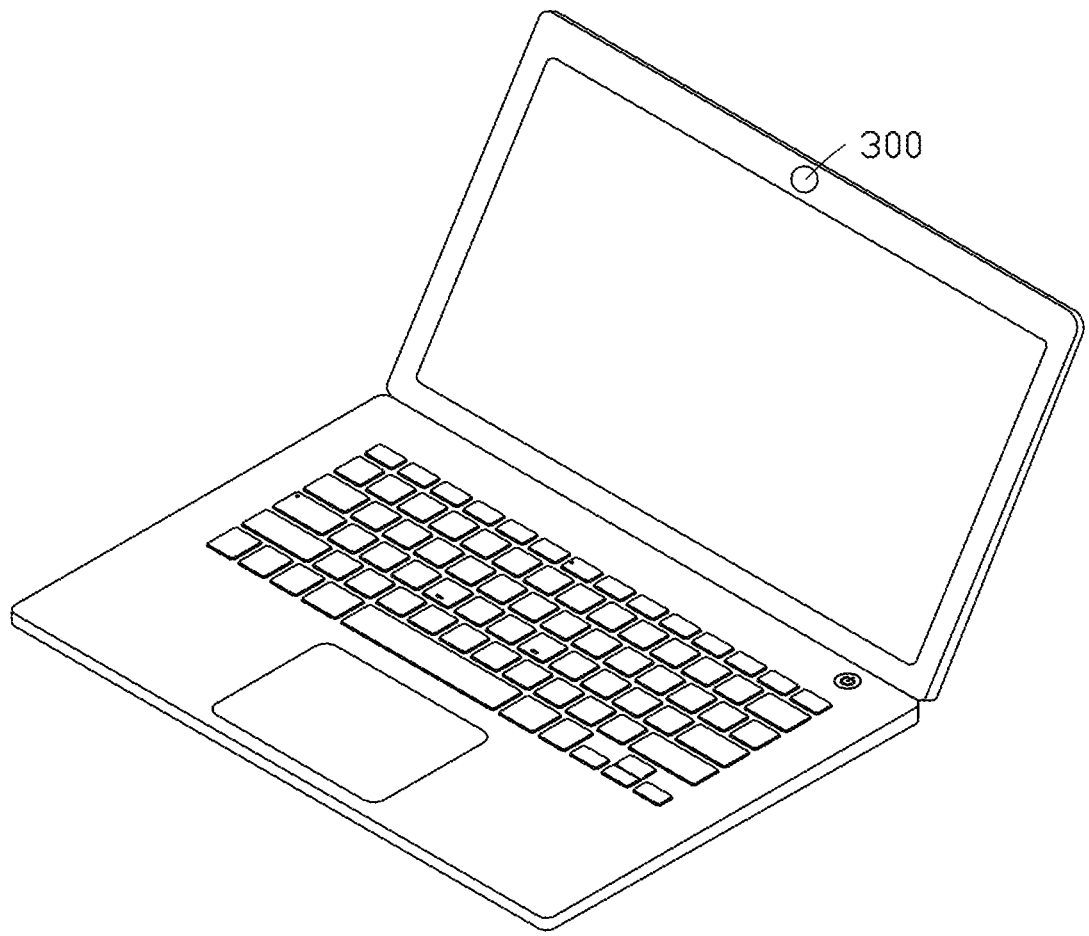
FIG. 6 is an isometric view of an electronic device according to an embodiment of the present disclosure.

Referring to FIG. 6, an electronic device 400 is also provided according to the present disclosure. The electronic device 400 includes the camera module 300. The electronic device 400 may be a mobile phone, a computer, a wearable device, a vehicle, or a monitoring device. In an embodiment, the electronic device 400 is a laptop computer.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A camera module comprising:
   a photosensitive assembly comprising:
   a circuit board comprising a first surface, a second surface opposite to the first surface, and a first through hole extending through the first surface and the second surface;
   a photosensitive chip disposed on the second surface, the photosensitive chip having a photosensitive area and a non-photosensitive area connected to the photosensitive area, the non-photosensitive area being electrically connected to one side of the second surface, and the photosensitive area being exposed from the first through hole;
   a reinforcing plate disposed on the first surface; and
   a thermal conductive layer disposed on the photosensitive chip, and the thermal conductive layer comprising a silica gel or a metal.

2. The camera module according to claim 1, wherein the reinforcing plate is a stainless steel plate.

3. The camera module according to claim 1, wherein the reinforcing plate defines a second through hole connected to the first through hole, and the photosensitive area is further exposed from the second through hole.

4. The camera module according to claim 1, wherein the thermal conductive layer comprises a thermal conductive silica gel or a copper foil.

5. The camera module according to claim 1, wherein a thickness of the thermal conductive layer is in a range between 0.05 mm to 0.12 mm.

6. The camera module according to claim 1, wherein the circuit board is a flexible circuit board, the photosensitive assembly further comprises a support frame disposed on the second surface, the support frame defines a third through hole configured for receiving the photosensitive chip, and a surface of the support frame away from the circuit board is flush with a surface of the photosensitive chip away from the circuit board.

7. The camera module according to claim 1, wherein the circuit board is a right circuit board, the second surface further defines a groove connected to the first through hole, and the photosensitive chip is received in the groove.

8. The camera module according to claim 1, wherein the photosensitive assembly further comprises a dustproof adhesive disposed on the reinforcing plate.

9. The camera module according to claim 1, further comprising a lens assembly disposed on the reinforcing plate.

10. The camera module according to claim 9, further comprising a filter received in the lens assembly and faces the photosensitive area of the photosensitive chip.

11. An electronic device comprising:
    a camera module comprising:
    a photosensitive assembly comprising:
    a circuit board comprising a first surface, a second surface opposite to the first surface, and a first through hole extending through the first surface and the second surface;
    a photosensitive chip disposed on the second surface, the photosensitive chip having a photosensitive area and a non-photosensitive area connected to the photosensitive area, the non-photosensitive area being electrically connected to one side of the second surface, and the photosensitive area being exposed from the first through hole;
    a reinforcing plate disposed on the first surface; and
    a thermal conductive layer disposed on the photosensitive chip, and the thermal conductive layer comprising a silica gel or a metal.

12. The electronic device according to claim 11, wherein the reinforcing plate is a stainless steel plate.

13. The electronic device according to claim 11, wherein the reinforcing plate defines a second through hole connected to the first through hole, and the photosensitive area is further exposed from the second through hole.

14. The electronic device according to claim 11, wherein the thermal conductive layer comprises a thermal conductive silica gel or a copper foil.

15. The electronic device according to claim 11, wherein a thickness of the thermal conductive layer is in a range between 0.05 mm to 0.12 mm.

16. The electronic device according to claim 11, wherein the circuit board is a flexible circuit board, the photosensitive assembly further comprises a support frame disposed on the second surface, the support frame defines a third through hole configured for receiving the photosensitive chip, and a surface of the support frame away from the circuit board is flush with a surface of the photosensitive chip away from the circuit board.

17. The electronic device according to claim 11, wherein the circuit board is a right circuit board, the second surface further defines a groove connected to the first through hole, and the photosensitive chip is received in the groove.

18. The electronic device according to claim 11, wherein the photosensitive assembly further comprises a dustproof adhesive disposed on the reinforcing plate.

19. The electronic device according to claim 11, wherein the camera module further comprises a lens assembly disposed on the reinforcing plate.

20. The electronic device according to claim 19, wherein the camera module further comprises a filter received in the lens assembly and faces the photosensitive area of the photosensitive chip.

* * * * *